(12) United States Patent
Motohiro et al.

(10) Patent No.: US 8,971,725 B2
(45) Date of Patent: Mar. 3, 2015

(54) OPTICAL COMMUNICATION MODULE AND CONTROL METHOD FOR OPTICAL COMMUNICATION MODULE

(75) Inventors: Satoshi Motohiro, Yokohama (JP); Kohsuke Shimodate, Yokohama (JP); Masahiro Hirai, Yokohama (JP)

(73) Assignee: Oclaro Japan, Inc., Kanagawa (JP)

( * ) Notice: Subject to any disclaimer, the term of this patent is extended or adjusted under 35 U.S.C. 154(b) by 448 days.

(21) Appl. No.: 12/902,284

(22) Filed: Oct. 12, 2010

(65) Prior Publication Data
US 2011/0085796 A1    Apr. 14, 2011

(30) Foreign Application Priority Data

Oct. 13, 2009    (JP) .................................. 2009-236593

(51) Int. Cl.
*H04B 10/54*    (2013.01)
*H04B 10/50*    (2013.01)
*H04B 10/564*    (2013.01)

(52) U.S. Cl.
CPC ........ *H04B 10/50595* (2013.01); *H04B 10/564* (2013.01)
USPC .......................................................... 398/198

(58) Field of Classification Search
USPC ........................................................ 398/182
See application file for complete search history.

(56) References Cited

U.S. PATENT DOCUMENTS

| 5,629,792 | A * | 5/1997 | Masaki .......................... 359/245 |
| 5,917,637 | A * | 6/1999 | Ishikawa et al. .............. 398/197 |
| 6,318,906 | B1 | 11/2001 | Ishizaka |
| 6,748,181 | B2 * | 6/2004 | Miki et al. ..................... 398/195 |
| 7,061,950 | B2 * | 6/2006 | Hongo et al. .............. 372/38.02 |
| 2003/0012244 | A1 * | 1/2003 | Krasulick et al. ............... 372/50 |
| 2003/0072337 | A1 * | 4/2003 | Miguelez et al. ............... 372/34 |
| 2004/0028099 | A1 * | 2/2004 | Hongo et al. .............. 372/38.02 |
| 2006/0113375 | A1 * | 6/2006 | Caiger ......................... 235/376 |
| 2009/0016676 | A1 * | 1/2009 | Morioka ........................ 385/27 |

FOREIGN PATENT DOCUMENTS

| JP | 2000-91695 | 3/2000 |
| JP | 2003-29222 | 1/2003 |
| JP | 2004-61556 | 2/2004 |

* cited by examiner

*Primary Examiner* — David Payne
*Assistant Examiner* — Tanya Motsinger
(74) *Attorney, Agent, or Firm* — Antonelli, Terry, Stout & Kraus, LLP.

(57) ABSTRACT

An optical communication module includes a laser that emits laser light, and an electro-absorber that absorbs the laser light, which is emitted from the laser, according to a voltage modulated based on a modulating signal and a bias voltage. The optical communication module detects data that varies correlatively with the temperature of the electro-absorber, and sets the bias voltage, which is associated with the detected data, on the basis of relational data specifying at least the relationship between the bias voltage and the data.

10 Claims, 7 Drawing Sheets

OPTICAL COMMUNICATION MODULE AND CONTROL METHOD FOR OPTICAL COMMUNICATION MODULE

CROSS-REFERENCE TO RELATED APPLICATION

The present application claims priority from Japanese application JP2009-236593 filed on Oct. 13, 2009, the content of which is hereby incorporated by reference into this application.

BACKGROUND OF THE INVENTION

1. Field of the Invention

The present invention relates to an optical communication module and a control method for the optical communication module.

2. Description of the Related Art

In order to realize a compact, low-power, and low-cost design for an optical communication module, a technology for making an optical module, which is mounted in the optical communication module, compact, low-power, and low-cost has been developed. For example, an optical module having an external modulation device and operating at a wavelength of 1550 nm is employed in an optical communication module for an intermediate or long transmission distance of 40 km or more. Especially, for the form factor of a pluggable module requested to be compact, an optical module in which an electro-absorption optical modulation device that utilizes electro-absorption is mounted as the external modulation device is adopted.

Some electro-absorption optical modulation devices include, as described in, for example, patent document 1 (JP 2000-91695A), a temperature control circuit, which keeps the temperature of the electro-absorption optical device constant, because the optical absorption characteristic thereof changes with an environmental change such as a change in temperature.

SUMMARY OF THE INVENTION

However, when a temperature control circuit is included in an optical module, power consumption increases due to temperature control. Further, the optical module grows in size, and costs more.

An object of the present invention is to provide an optical communication module and a control method for the optical communication module capable of offering an excellent optical transmission characteristic without inclusion of a temperature control circuit in an optical module.

For accomplishment of the above object, an optical communication module in accordance with one aspect of the present invention includes: a laser light emitting device that emits laser light; an electro-absorption optical modulation device that absorbs the laser light, which is emitted from the laser light emitting device, according to a voltage modulated based on a modulating signal and a bias voltage; a detection unit that detects data which varies correlatively with the temperature of the electro-absorption optical modulation device; and a setting unit that sets a bias voltage, which is associated with the data detected by the detection unit, on the basis of relational data specifying at least the relationship between the bias voltage and the data.

In an optical communication module in accordance with another aspect of the present invention, data detected by the detection unit positively correlates with the temperature of the electro-absorption optical modulation device, and the relational data specifies the relationship between the bias voltage and data so that the bias voltage rises along with an increase in the data.

In an optical communication module in accordance with still another aspect of the present invention, the detection unit detects a current to be fed to the laser light emitting device, and the setting unit sets a bias voltage, which is associated with the current detected by the detection unit, on the basis of relational data specifying the relationship between the bias voltage and the current to be fed.

In an optical communication module in accordance with still another aspect of the present invention, the detection unit detects the temperature of the optical communication module, and the setting unit sets a bias voltage, which is associated with the temperature detected by the detection unit, on the basis of relational data specifying the relationship between the bias voltage and the temperature to be detected.

In an optical communication module in accordance with still another aspect of the present invention, the relational data specifies the relationship between a current set value, with which a current to be fed to the laser light emitting device is controlled, and the temperature to be detected, and the detection unit sets the current set value associated with the temperature detected by the detection unit.

An optical communication module in accordance with still another aspect of the present invention further includes: a light receiving device that receives a backward optical output of the laser light emitting device; and a unit that calculates an output light intensity obtained from the optical communication module by a function that is a product of an expression, which includes as a variable the data detected by the detection unit, by an optical output detected by the light receiving device.

In an optical communication module in accordance with still another aspect of the present invention, the relational data specifies the relationships of an amplitude of a modulating signal, cross points, and a bias voltage to the data to be detected, and the setting unit sets the amplitude, cross points, and bias voltage associated with the data detected by the detection unit.

A control method for an optical communication module in accordance with one aspect of the present invention is a control method for an optical communication module including a laser light emitting device that emits laser light, and an electro-absorption optical modulation device that absorbs the laser light, which is emitted from the laser light emitting device, according to a voltage modulated based on a modulating signal and a bias voltage. The control method includes a detection step of detecting data that varies correlatively with the temperature of the electro-absorption optical modulation device, and a setting step of setting the bias voltage, which is associated with the data detected at the detection step, on the basis of relational data specifying at least the relationship between the bias voltage and the data.

According to the one aspect of the present invention, the waveform of an optical output from the optical communication module can be appropriately controlled without inclusion of a circuit that keeps the temperature of the electro-absorption optical modulation device constant.

According to the one aspect of the present invention, the waveform of an optical output from the optical communication module can be appropriately controlled based on a change in the temperature of the electro-absorption optical modulation device.

According to the one aspect of the present invention, the waveform of an optical output from the optical communication module can be appropriately controlled based on a current fed to the laser light emitting device.

According to the one aspect of the present invention, the waveform of an optical output from the optical communication module can be appropriately controlled based on the temperature of the optical communication module.

According to the one aspect of the present invention, the waveform of an optical output from the optical communication module can be appropriately controlled by controlling a current, which is fed to the laser light emitting device, according to the temperature of the optical communication module.

According to the one aspect of the present invention, the intensity of an optical output from the optical communication module can be highly precisely calculated.

According to the one aspect of the present invention, compared with a case where the amplitude of a modulating signal and cross points are fixed, the waveform of an optical output from the optical communication module can be finely controlled.

DETAILED DESCRIPTION OF THE INVENTION

Preferred embodiments for implementing the present invention will be described below in conjunction with drawings.

Figure 1:
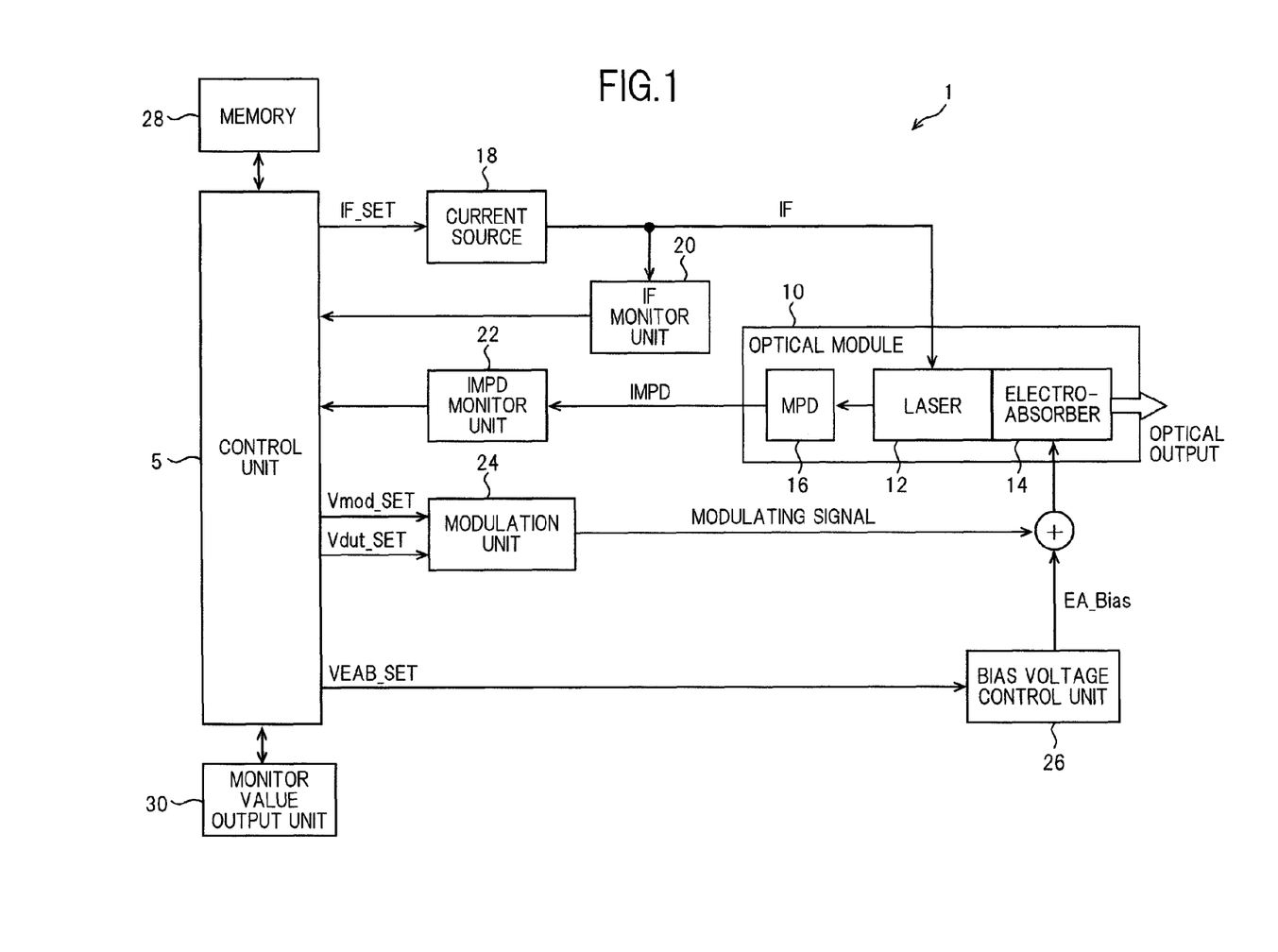
FIG. 1 is a functional block diagram showing the configuration of an optical communication module for intermediate- or long-distance transmission in accordance with a first embodiment.

FIG. 1 is a functional block diagram showing the configuration of an optical communication module 1 for intermediate- or long-distance transmission in accordance with a first embodiment of the present invention. As shown in FIG. 1, the optical communication module 1 includes a control unit 5, an optical module 10, a current source 18, an IF monitor unit 20, an intensity monitoring photodiode (hereinafter, IMPD) monitor unit 22, a modulation unit 24, a bias voltage control unit 26, a memory 28, and a monitor value output unit 30.

The control unit 5 includes a processor that processes signals, and controls the components of the optical communication module 1. For example, the control unit 5 acquires monitor values outputted from the IF monitor unit 20, IMPD monitor unit 22 and the like, and controls set values, which are set in the current source 18, the modulation unit 24, the bias voltage control unit 26 and the like, on the basis of the acquired monitor values.

The optical module 10 is a module that includes a laser 12, an electro-absorber 14, and a monitoring photodiode (hereinafter, MPD) 16, and transmits a light signal modulated based on transmission data.

The laser 12 is a device that emits light according to a driving current fed from the current source 18. Forward emission light emitted through the front end of the laser 12 is inputted to the electro-absorber 14, while backward emission light emitted through the rear end of the laser 12 is inputted to the MPD 16.

The electro-absorber 14 is an electro-absorption optical modulation device that absorbs laser light emitted from the laser 12, and outputs an intensity-modulated light signal according to a driving voltage dependent on a bias voltage generated by the bias voltage control unit 26, and a modulating signal generated by the modulation unit 24.

Figure 2:
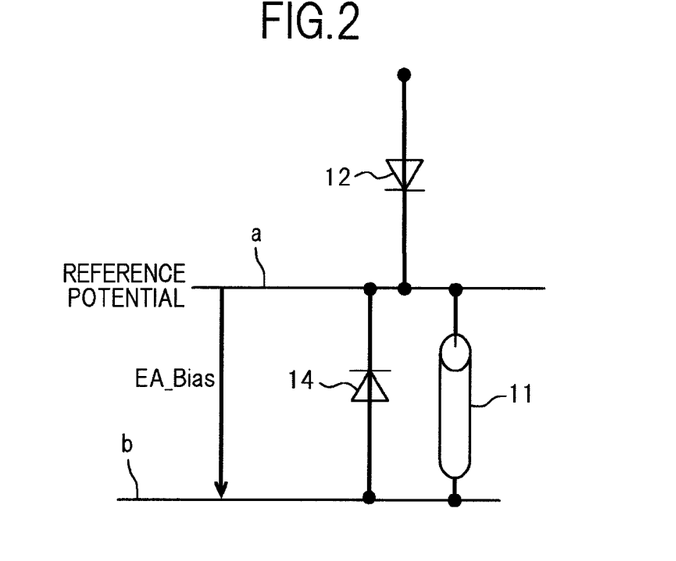
FIG. 2 is an internal circuit diagram of an optical module.

FIG. 2 is an internal circuit diagram of the optical module 10. As shown in FIG. 2, a cathode terminal of the laser 12 and a cathode terminal of the electro-absorber 14 are joined, and the electro-absorber 14 and an impedance matching circuit are connected in parallel with each other. The cathode terminal of the laser 12 and the cathode terminal of the electro-absorber 14 may be connected to the package of the optical communication module 1 and thus brought to a ground potential. The joint region between the cathode terminal of the laser 12 and the cathode terminal of the electro-absorber 14 is brought to a reference potential. EA Bias denotes a dc potential at the anode terminal of the electro-absorber 14 with the reference potential "a" as a reference. For example, a range of EA_Bias values from −3 V to 0 V may be regarded as an operating range according to power consumption or the characteristic of the device.

Figure 3:
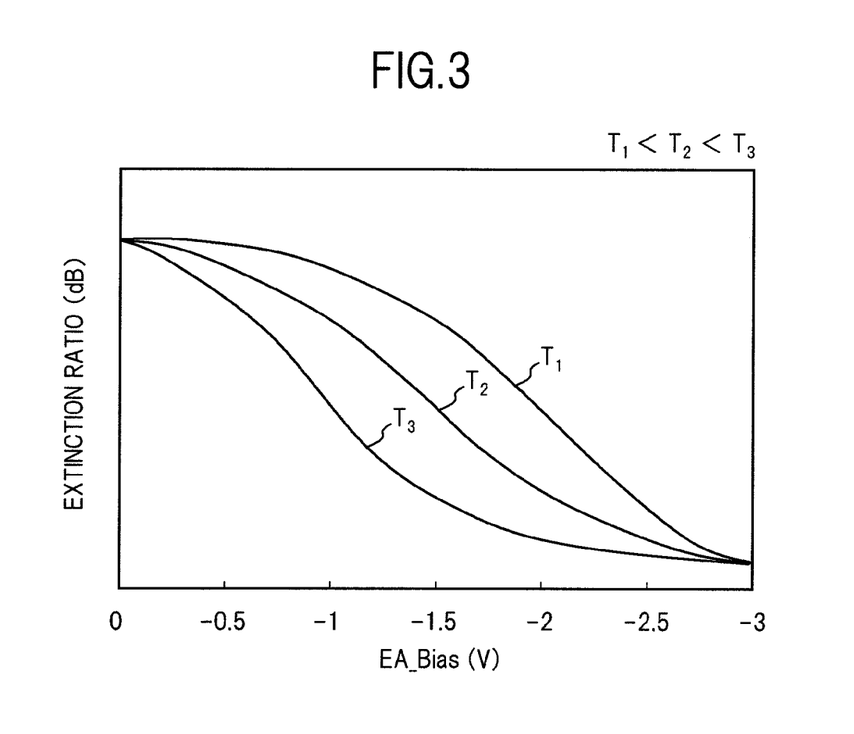
FIG. 3 is a diagram showing an example of a light extinction characteristic dependent on the temperature of an electro-absorber.

FIG. 3 is a diagram showing an example of a light extinction characteristic associated with the temperature of the electro-absorber 14. As shown in FIG. 3, the light extinction characteristic of the electro-absorber 14 changes along with a change in the temperature of the electro-absorber 14. For example, assuming that the relationship among temperatures $T_1$, $T_2$, and $T_3$ is $T_1 < T_2 < T_3$, EA_Bias values relating to a sharp change in an extinction ratio of the electro-absorber 14 are shifted to larger ones (that is, shifted toward the reference potential).

The MPD 16 is a monitoring photodiode that receives backward emission light emitted through the rear end of the laser 12. A current flows into the MPD 16 according to the intensity of the received backward emission light.

The IMPD monitor unit 22 senses a current that flows into the MPD 16 in response to reception of backward emission light emitted through the rear end of the laser 12, and outputs an MPD monitor value, which is a voltage into which the sensed current is converted, to the control unit 5.

The current source 18 is a circuit that generates a driving current IF to be fed to the laser 12. The driving current IF is controlled based on an IF_SET value set by the control unit 5.

For example, the IF_SET value may be set based on the difference between the voltage sensed by the IMPD monitor unit 22 and the reference voltage.

The IF monitor unit 20 is a circuit that detects a driving current to be fed from the current source 18 to the laser 12 according to the IF_SET value set by the control unit 5. A monitor value of the driving current detected by the IF monitor unit 20 (IF monitor value) is outputted to the control unit 5.

The modulation unit 24 generates a modulating signal on the basis of an amplitude and cross points that are set. The amplitude is controlled with a Vmod_SET value set by the control unit 5, and the cross points are controlled with a Vdut_SET value set by the control unit 5.

The bias voltage control unit 26 generates a bias voltage to be applied to the electro-absorber 14. The bias voltage is controlled with a VEAB_SET value set by the control unit 5.

Assuming that the IF_SET, Vmod_SET, Vdut_SET, and VEAB_SET set values are fixed and temperature control of the electro-absorber 14 is not implemented, the waveform of an optical output from the optical communication module 1 is disturbed due to a change in the extinction characteristic of the electro-absorber 14 dependent on the temperature like the one shown in FIG. 3. In particular, deterioration of a characteristic concerning intermediate- or long-distance transmission is outstanding and becomes a factor causing a communication failure. In the first embodiment of the present invention, the EA_Bias value is controlled based on the value of the driving current IF detected by the IF monitor unit 20 in efforts to maintain an excellent optical output waveform. Concrete control will be described below.

The memory 28 is used to store relational data which specifies the relationship between data detected inside the optical communication module 1 and a set value to be set in at least one of the current source 18, modulation unit 24, and bias voltage control unit 26, and may be constructed with, for example, a nonvolatile memory. In the first embodiment, the relational data specifying the relationship between the IF monitor value detected by the IF monitor unit 20 and the VEAB_SET value to be set in the bias voltage control unit 26 shall be stored in the memory 28.

The relational data may be data that uses an IF monitor value obtained at each of temperatures and a EA_Bias value decided dependent on the extinction characteristic of the electro-absorber 14 at the temperature, and specifies the relationship between the IF monitor value and VEAB_SET value. The relational data may be structured as a lookup table that specifies the VEAB_SET value in association with each IF monitor value, or may be data that is an expression (polynomial expression) representing the relationship between the IF monitor value and VEAB_SET value.

In the present embodiment, the control unit 5 implements control so that the EA_Bias value increases along with an increase in the IF monitor value. This is because the temperature of the electro-absorber 14 and the IF monitor value have a positive correlation (that is, when the temperature of the electro-absorber 14 rises, the IF monitor value increases). If the temperature of the electro-absorber 14 rises, EA_Bias values relating to a sharp change in the extinction ratio of the electro-absorber 14 shift to large ones. By shifting a bias voltage accordingly, a disturbance in the waveform of an output signal can be suppressed.

Figure 4:
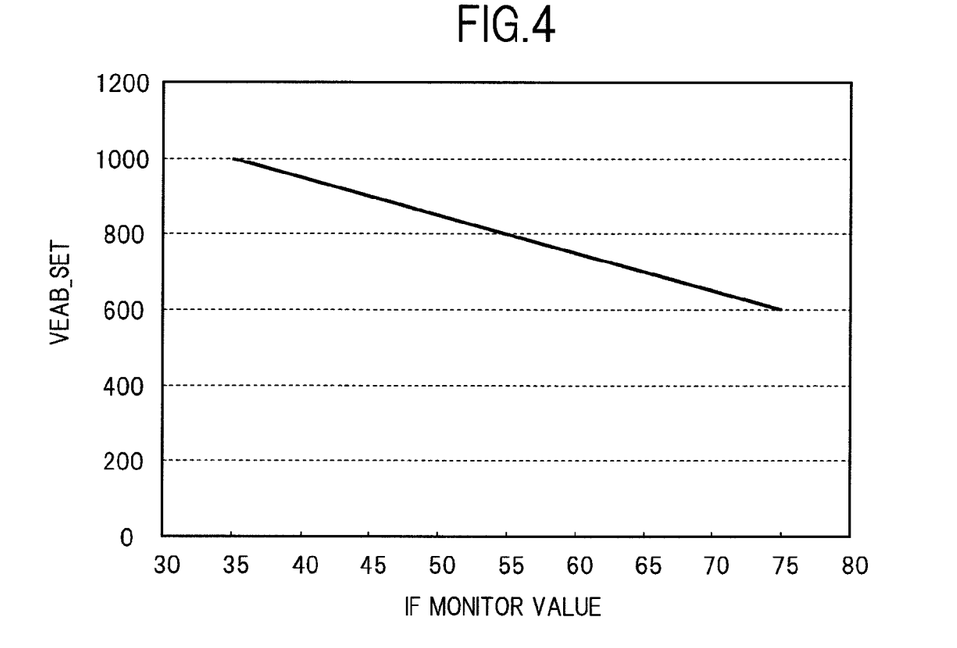
FIG. 4 is a diagram showing an example of relational data representing the relationship between an IF monitor value and a bias voltage set value.

FIG. 4 shows an example of relational data representing the relationship between an IF monitor value and a bias voltage set value (VEAB_SET). As shown in FIG. 4, the IF monitor value and VEAB_SET value have the relationship that when the IF monitor value increases, the VEAB_SET value decreases. This is because the EA_Bias value is set proportionally to an inverse number of the VEAB_SET value. The relationship between the IF monitor value and VEAB_SET value shown in FIG. 4 may be produced by, for example, sequentially plotting discrete sample data items of the IF monitor value and VEAB_SET value, or by inferring a linear relational expression from the sample data items using the least squares method. Needless to say, the relationship between the IF monitor value and VEAB_SET value may be determined based on the characteristic of the electro-absorber 14, and is not limited to a linear relationship but may be non-linear.

Figure 5:
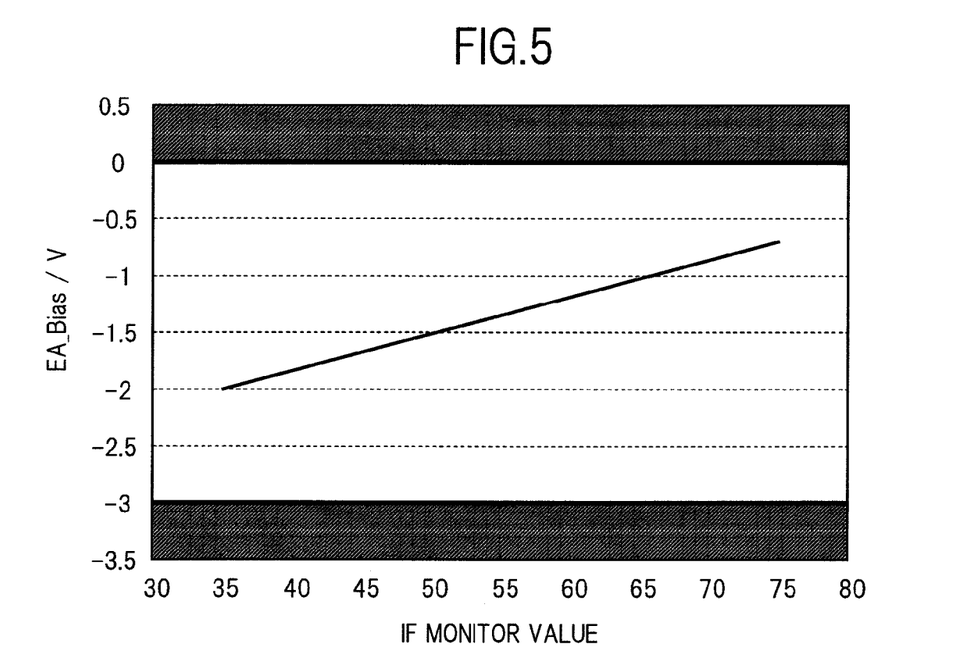
FIG. 5 is a diagram showing an example of the relationship between an IF monitor value and a bias voltage.

FIG. 5 shows an example of the relationship between an IF monitor value and a bias voltage (EA_Bias). The relationship between the IF monitor value and bias voltage shown in FIG. 5 is based on the relational data shown in FIG. 4, and is such that the bias voltage increases along with an increase in the IF monitor value.

Figure 6:
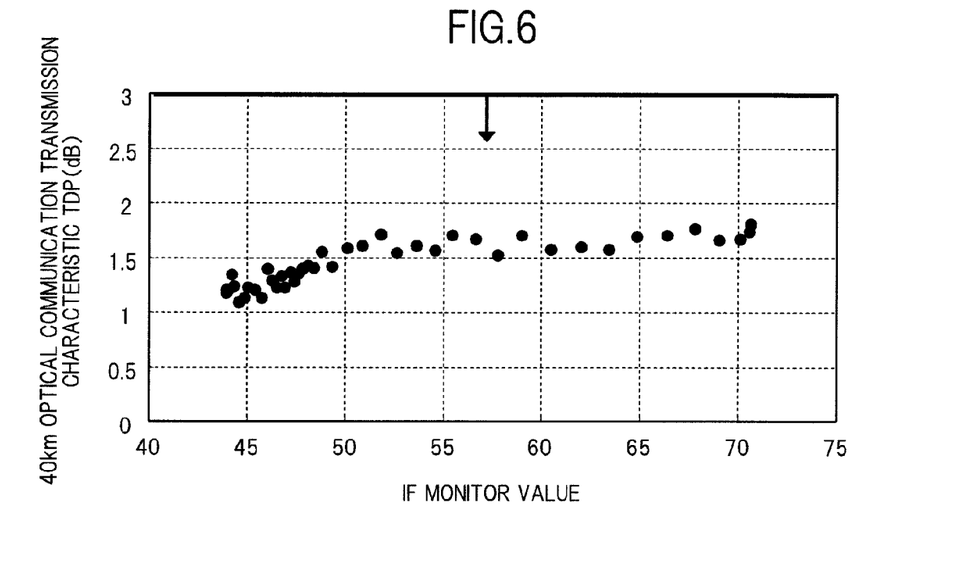
FIG. 6 is a diagram showing an optical communication transmission characteristic TDP for 40 km of the optical communication module in accordance with the first embodiment.

FIG. 6 shows an optical communication transmission characteristic TDP (dB) for 40 km of the optical communication module 1 in accordance with the first embodiment. The example shown in FIG. 6 is an example in which the optical communication transmission characteristic TDP is measured based on the relationship between the IF monitor value and bias voltage set value shown in FIG. 4. As shown in FIG. 6, even the optical communication module 1 devoid of a temperature control circuit that keeps the temperature of the electro-absorber 14 constant can satisfy a specification (for example, 3 dB or less) requested for the 40 km optical communication transmission characteristic.

In the foregoing embodiment, at least the relationship between an IF monitor value and bias voltage set value is specified in relational data. In addition to the IF monitor value and bias voltage set value, the relationship between the IF monitor value and the amplitude (Vmod_SET) of a modulating signal and/or the cross points (Vdut_SET) thereof may be specified.

The monitor value output unit 30 outputs an optical output intensity, which has been calculated by the control unit 5 and is received from the optical module 10, to a display device. In the present embodiment, the control unit 5 calculates the optical output intensity PF according to equations (1) to (3) presented below, and outputs it to the monitor value output unit 30.

$$PF = (A_{coef} \cdot IF\_mon + B_{coef}) \cdot MPD\_mon \quad (1)$$

where IF_mon denotes an IF monitor value detected by the IF monitor unit 20, and MPD_mon denotes a MPD monitor value detected by the IMPD monitor unit 22. $A_{coef}$ and $B_{coef}$ denote coefficients to be calculated and set for each optical communication module. For example, the $A_{coef}$ and $B_{coef}$ values may be calculated as described below.

To begin with, an optical output intensity outputted from the optical communication module 1 is measured under two sets of conditions including different temperature conditions, and IF monitor values and MPD monitor values obtained at that time are stored. Assuming that IF1, MPD1, and PF1 denote the IF monitor value, MPD monitor value, and optical output intensity obtained under the first conditions, and that IF2, MPD2, and PF2 denote the IF monitor value, MPD monitor value, and optical output intensity obtained under the second conditions, $A_{coef}$ and $B_{coef}$ are expressed by equations (2) and (3) below.

$$A_{coef} = (PF2/MPD2 - PF1/MPD1)/(IF2 - IF1) \quad (2)$$

$$B_{coef} = (PF2/MPD2) - A_{coef} \cdot IF2 \quad (3)$$

Figure 7:
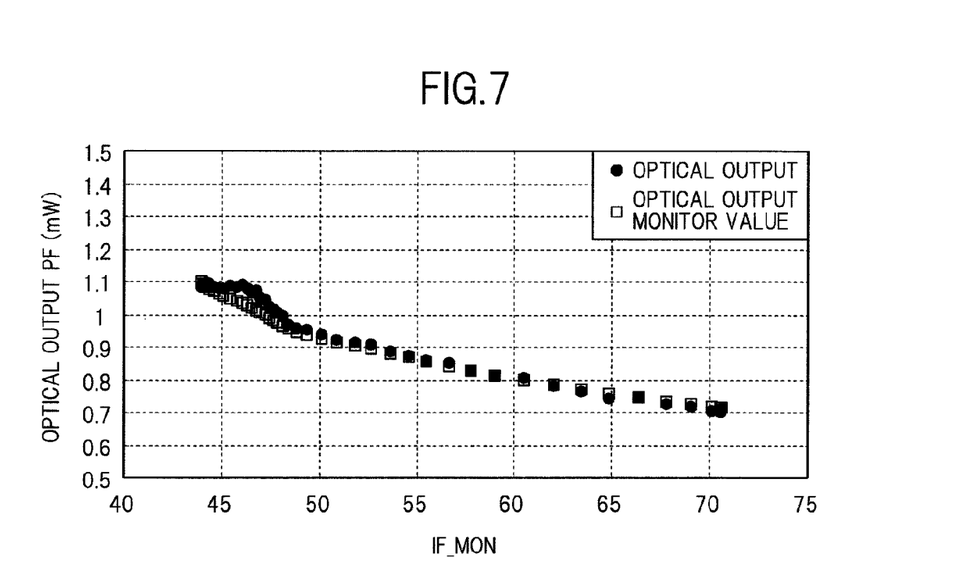
FIG. 7 is a diagram showing the results of comparison of an optical output intensity PF of the optical communication module in accordance with the first embodiment with an actual optical output.

FIG. 7 shows the results of comparison of the optical output intensity PF, which is calculated using the foregoing equations (1) to (3), with an actual optical output. As shown in FIG. 7, the optical output intensity calculated based on the IF monitor value substantially corresponds to the actual optical output. In the present embodiment, the optical output intensity PF is calculated by multiplying a linear expression involving an IF_mon variable by an MPD_mon variable. The expression including the IF_mon variable may be a polynomial expression. If the expression involving the IF_mon variable is the polynomial expression, the number of sets of conditions including different temperature conditions is increased based on the degree in order to calculate the $A_{coef}$ and $B_{coef}$ values.

According to the foregoing first embodiment of the present invention, an optical communication module that can save power and be compactly designed and that exhibits an excellent optical transmission characteristic despite a change in the temperature of the electro-absorber 14 can be provided without inclusion of a temperature control circuit.

Figure 8:
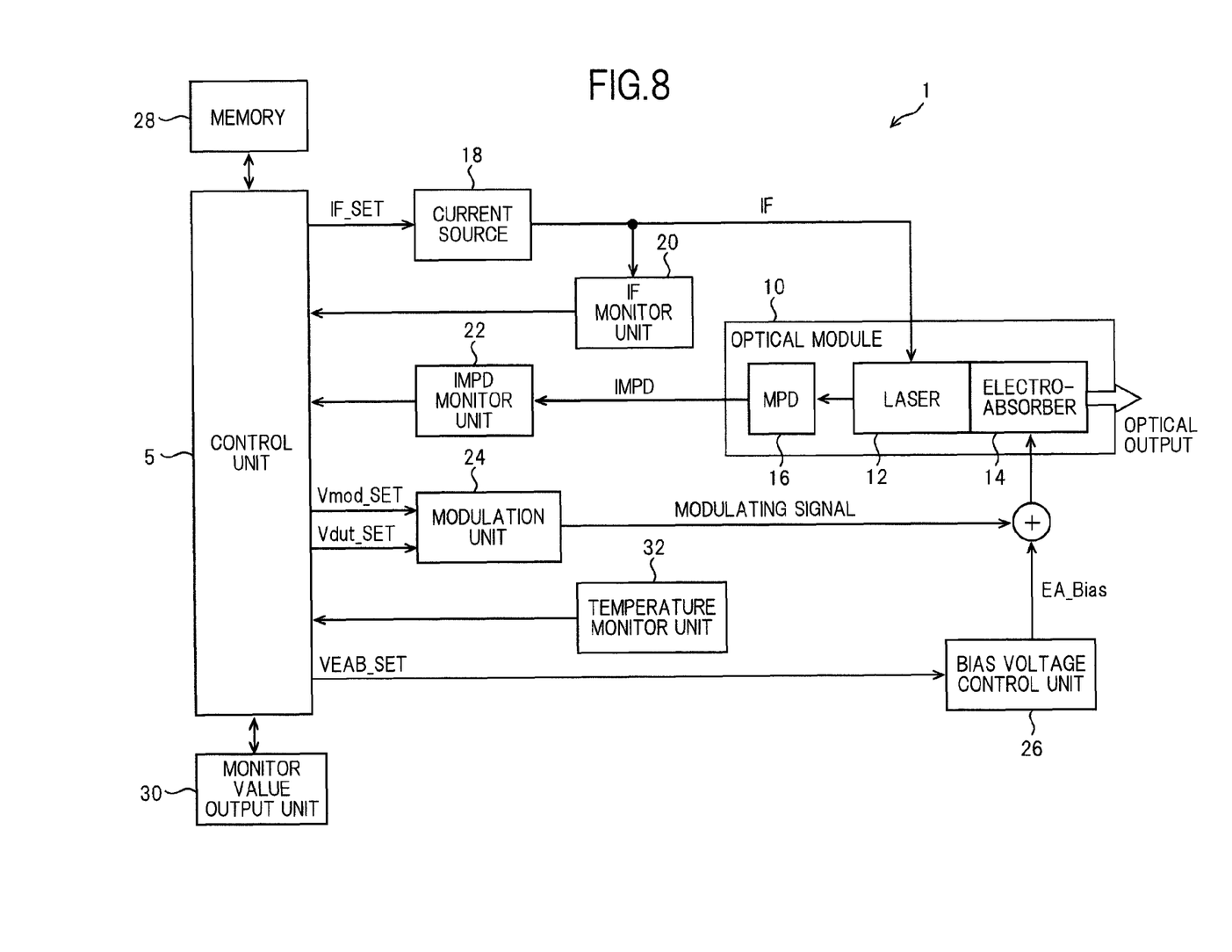
FIG. 8 is a functional block diagram showing the configuration of an optical communication module in accordance with a second embodiment.

Next, an optical communication module 1 in accordance with a second embodiment of the present invention will be described below. FIG. 8 is a functional block diagram showing the configuration of the optical communication module 1 in accordance with the second embodiment. As shown in FIG. 8, the optical communication module 1 includes a control unit 5, an optical module 10, a current source 18, an IF monitor unit 20, an IMPD monitor unit 22, a modulation unit 24, a bias voltage control unit 26, a memory 28, a monitor value output unit 30, and a temperature monitor unit 32. The optical communication module 1 in accordance with the second embodiment is different from the optical communication module 1 in accordance with the first embodiment in a point that the optical communication module 1 in accordance with the second embodiment includes the temperature monitor unit 32. The other components are included in common. The description of the common points will be omitted, and the different point alone will be described below.

The temperature monitor unit 32 detects the temperature of the optical communication module 1. For example, the temperature of the optical communication module 1 may be detected based on a change in a resistance value of a thermistor included in the optical communication module 1. The temperature monitor unit 32 may detect the ambient temperature of the optical module 10, or may detect the temperature of any other part inside the package of the optical communication module 1. A temperature monitor value detected by the temperature monitor unit 32 is outputted to the control unit 5. The control unit 5 may control part or all of IF_SET, Vmod_SET, Vdut_SET, and VEAB_SET values on the basis of the temperature monitor value inputted from the temperature monitor unit 32.

In the second embodiment, relational data representing the relationship between the temperature monitor value and VEAB_SET value is stored in the memory 28. The control unit 5 reads the VEAB_SET set value in association with the temperature monitor value detected by the temperature monitor unit 32, and changes the EA_Bias value.

In the present embodiment, the control unit 5 implements control so that the EA_Bias value increases along with an increase in the temperature monitor value. This is because the temperature of the optical module 10 and temperature monitor value have a positive correlation (that is, when the temperature of the electro-absorber 14 rises, the temperature monitor value increases). When the temperature of the electro-absorber 14 rises, EA_Bias values relating to a sharp change in the extinction ratio of the electro-absorber 14 are shifted to larger ones. By shifting a bias voltage accordingly, a disturbance in the waveform of an output signal can be suppressed.

Figure 9:
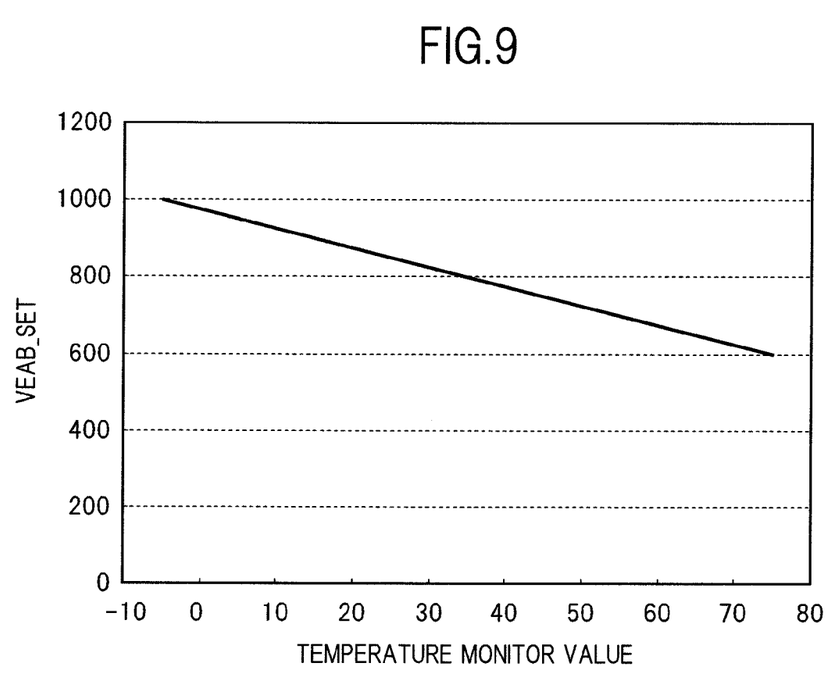
FIG. 9 is a diagram showing an example of relational data representing the relationship of association between a temperature monitor value and a bias voltage set value.

FIG. 9 shows an example of relational data representing the relationship of association between a temperature monitor value and a bias voltage set value (VEAB_SET). As shown in FIG. 9, the temperature monitor value and VEAB_SET value have the relationship that when the temperature monitor value increases, the VEAB_SET value decreases. This is because the EA_Bias value is set proportionally to an inverse value of the VEAB_SET value. Incidentally, the relationship between the temperature monitor value and VEAB_SET value shown in FIG. 9 may be produced by, for example, sequentially plotting discrete sample data items of the temperature monitor value and VEAB_SET values, or inferring a linear relational expression from the sample data items using the least squares method. Needless to say, the relationship between the temperature monitor value and VEAB_SET value may be determined based on the characteristic of the electro-absorber 14, and may not be limited to a linear relationship but may be non-linear.

Figure 10:
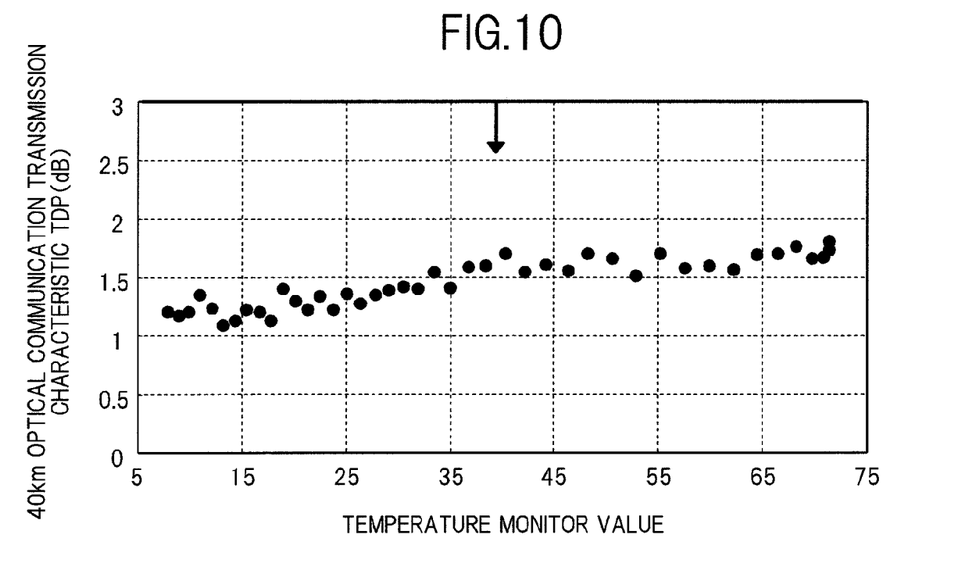
FIG. 10 is a diagram showing an optical communication transmission characteristic TDP for 40 km of the optical communication module in accordance with the second embodiment.

FIG. 10 shows an optical communication transmission characteristic TDP (dB) for 40 km of the optical communication module 1 in accordance with the second embodiment. The example shown in FIG. 10 is an example in which the optical communication transmission characteristic TDP is measured based on the relationship between the temperature monitor value and bias voltage set value shown in FIG. 9. As shown in FIG. 10, even the optical communication module 1 devoid of a temperature control circuit that keeps the temperature of the electro-absorber 14 constant can satisfy a specification requested for the 40 km optical communication transmission characteristic.

In the aforesaid embodiment, at least the relationship between the temperature monitor value and bias voltage set value is specified in relational data. In addition to the temperature monitor value and bias voltage set value, the relationship to at least one of IF_SET, Vmod_SET, and Vdut_SET values may be specified.

In the second embodiment, the control unit 5 may calculate an optical output intensity PF according to equations (4) to (6) presented below, and output it to the monitor value output unit 30.

$$PF=(A_{coef}\cdot Th\_mon+B_{coef})\cdot MPD\_mon \quad (4)$$

where Th_mon denotes a temperature monitor value detected by the temperature monitor unit 32, and MPD_mon denotes an MPD monitor value detected by the IMPD monitor unit 22. $A_{coef}$ and $B_{coef}$ denote coefficients to be calculated and set for each optical communication module. The $A_{coef}$ and $B_{coef}$ values may be calculated as mentioned below, for example.

To begin with, an optical output intensity outputted from the optical communication module 1 is measured under two sets of conditions including different temperature conditions, and temperature monitor values and MPD monitor values obtained at that time are stored. Assuming that Th1, MPD1, and PF1 denote the temperature monitor value, MPD monitor value, and optical output intensity obtained under the first conditions, and Th2, MPD2, and PF2 denote the temperature monitor value, MPD monitor value, and optical output intensity obtained under the second conditions, $A_{coef}$ and $B_{coef}$ are expressed by equations (5) and (6) below.

$$A_{coef}=(PF2/MPD2-PF1/MPD1)/(Th2-Th1) \quad (5)$$

$$B_{coef}=(PF2/MPD2)-A_{coef}\cdot Th2 \quad (6)$$

Figure 11:
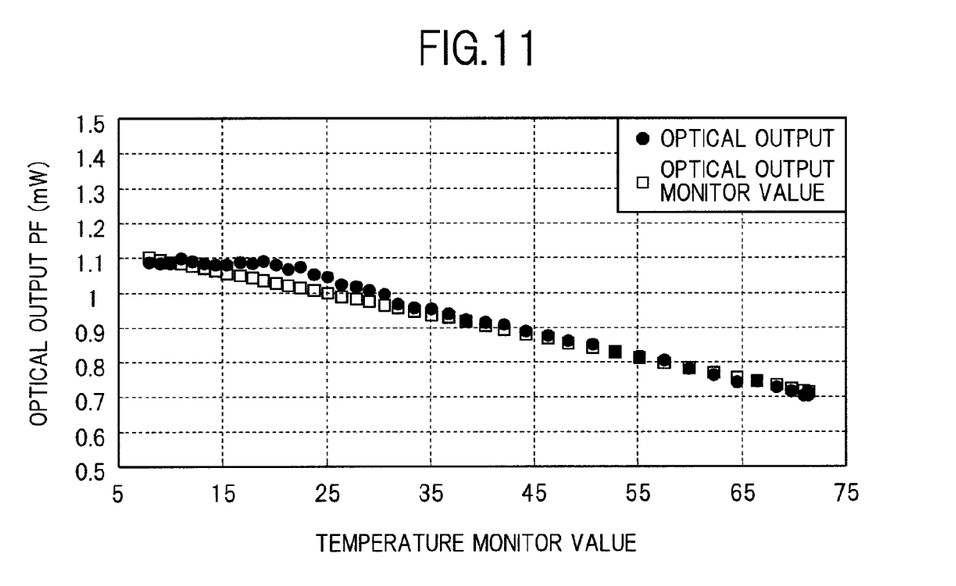
FIG. 11 is a diagram showing the results of comparison of an optical output intensity PF of the optical communication module in accordance with the second embodiment with an actual optical output.

FIG. 11 shows the results of comparison of the optical output intensity PF, which is calculated based on the equations (4) to (6), with an actual optical output. As shown in FIG. 11, the optical output intensity calculated based on the temperature monitor value substantially corresponds to the actual optical output. In the present embodiment, the optical output intensity PF is calculated by multiplying a linear expression involving a Th_mon variable by an MPD_mon variable, the expression including the Th_mon variable may be a polynomial expression. If the expression involving the Th_mon variable is the polynomial expression, the number of sets of conditions including different temperature conditions is increased based on the degree in order to calculate the $A_{coef}$ and $B_{coef}$ values.

A power and space needed for the temperature monitor unit 32 are small compared with those for a temperature control circuit that keeps the temperature of the electro-absorber 14 constant. According to the second embodiment of the present invention, an optical communication module that can save power and be designed compactly and that exhibits an excellent optical transmission characteristic can be provided without inclusion of the temperature control circuit.

The present invention is not limited to the aforesaid embodiments. For example, in the aforesaid embodiments, a bias voltage is controlled using an IF monitor value and a temperature monitor value. The present invention is not limited to the IF monitor value and temperature monitor value. Any other data can be adopted as long as the data correlates with a temperature change in the electro-absorber 14, such as, a current flowing into the electro-absorber 14.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical communication module comprising:
   a laser light emitting device that emits laser light;
   a light receiving device that receives a backward optical output of the laser light emitting device;
   a monitor unit that senses a current that flows into the light receiving device;
   an electro-absorption optical modulation device that absorbs the laser light, according to a voltage modulated based on a modulating signal and a bias voltage;
   a detection unit that detects data which varies correlatively with the temperature of the optical communication module;
   a setting unit that sets a bias voltage, which is associated with the data detected by the detection unit, on the basis of relational data specifying at least the relationship between the bias voltage and the data;
   a control unit that calculates an optical output intensity outputted from the optical communication module based on the current sensed b the monitor unit and the data detected by the detection unit; and
   a monitor value output unit that outputs the optical output intensity;
   wherein the optical communication module does not include a temperature control circuit.

2. The optical communication module according to claim 1, wherein the data detected by the detection unit positively correlates with the temperature of the electro-absorption optical modulation device, and the relational data specifies the relationship between the bias voltage and the data so that the bias voltage increases along with an increase in the data.

3. The optical communication module according to claim 1, wherein the detection unit detects a current to be fed to the laser light emitting device, and the setting unit sets the bias voltage, which is associated with the current detected by the detection unit, on the basis of relational data specifying the relationship between the bias voltage and the current to be fed.

4. The optical communication module according to claim 1, wherein the detection unit detects the temperature of the optical communication module, and the setting unit sets the bias voltage, which is associated with the temperature detected by the detection unit, on the basis of relational data specifying the relationship between the bias voltage and the temperature to be detected.

5. The optical communication module according to claim 4, wherein the relational data specifies the relationship between a current set value, with which a current to be fed to the laser light emitting device is controlled, and the temperature to be detected, and the setting unit sets the current set value associated with the temperature detected by the detection unit.

6. The optical communication module according to claim 4:
   wherein the optical output intensity is determined according to a formula (1):

$$PF = (A\text{coef} \cdot Th \text{ mon} + B\text{coef}) \cdot MPD \text{ mon} \quad (1)$$

where PF is the optical output intensity, Th mon is a temperature monitor value detected by the detection unit, MPD mon is a monitor value detected by the monitor unit, Acoef is according to a formula (2), and Bcoef is according to a formula (3)

$$A\text{coef} = (PF2/MPD2 - PF1/MPD1)/(Th2 - Th1) \quad (2)$$

$$B\text{coef} = (PF2/MPD2) - A\text{coef} \cdot Th2 \quad (3)$$

where Th1, MPD1 and PF1 denote the temperature monitor value detected by the detection unit, the monitor value detected by the monitor unit, and optical intensity obtained under a first condition, and Th2, MPD2 and PF2 denote the temperature monitor value detected by the detection unit, the monitor value detected by the monitor unit, and optical intensity obtained under a second condition, Th1 is different from Th2.

7. The optical communication module according to claim 1, wherein the relational data specifies the relationships of an amplitude of a modulating signal, cross points, and a bias voltage to the data to be detected, and the setting unit sets the amplitude, the cross points, and the bias voltage associated with the data detected by the detection unit.

8. A control method for an optical communication module including a laser light emitting device that emits laser light, and an electro-absorption optical modulation device that absorbs the laser light, which is emitted from the laser light emitting device, according to a voltage modulated based on a modulating signal and a bias voltage, a light receiving device that receives a backward optical output of the laser light emitting device, and a monitor value output unit that outputs an optical output intensity, the optical communication module does not include a temperature control circuit, the method comprising the steps of:
   detecting data that varies correlatively with the temperature of the electro-absorption optical modulation device;
   operating the electro-absorption optical modulation device without a temperature control circuit that keeps temperature of the electro-absorption optical modulation device constant; and setting the bias voltage, which is associated with the data detected at the detecting step, on the basis of relational data specifying at least the relationship between the bias voltage and the data;

detecting current that flows into the light receiving device;

calculating the optical output intensity based on the detected data and the detected current; and outputting the calculated optical output intensity by the monitor value output unit.

9. An optical communication module comprising:

a laser;

a light receiving device that receives a backward optical output of the laser;

a monitor unit that senses a current that flows into the light receiving device;

an electro-absorption optical modulator for modulating a laser light from the laser operating without a temperature controller that keeps temperature of the electro-absorption optical modulator constant;

a temperature monitor detecting temperature of the optical communication module;

a memory storing a relational data between temperature of the optical communication module and a bias voltage for operating the electro-absorption optical modulator;

a controller for setting a predetermined bias voltage to the electro-absorption optical modulator according to the detected temperature by the temperature monitor and the relational data in the memory; and a monitor value output unit that outputs an optical output intensity, which has been calculated by the controller unit;

wherein the controller unit calculates the optical output intensity based on data from the temperature monitor and the monitor unit:

wherein the optical communication module does not include a temperature control circuit.

10. The optical communication module according to claim 3 wherein the optical output intensity is determined according to a formula (1):

$$PF = (Acoef \cdot IF\,mon + Bcoef) \cdot MPD\,mon \quad (1)$$

where PF is the optical output intensity, IF mon is a current monitor value detected by the detection unit, MPD mon is a monitor value detected by the monitor unit, Acoef is according to a formula (2), and Bcoef is according to a formula (3)

$$Acoef = (PF2/MPD2 - PF1/MPD1)/(IF2 - IF1) \quad (2)$$

$$Bcoef = (PF2/MPD2) - Acoef \cdot IF2 \quad (3)$$

where IF1, MPD1 and PF1 denote the temperature monitor value detected by the detection unit, the monitor value detected by the monitor unit, and optical intensity obtained under a first condition, and IF2, MPD2, and PF2 denote the temperature monitor value detected by the detection unit, the monitor value detected by the monitor unit, and optical intensity obtained under a second condition, IF1 is different from IF2.

* * * * *